US012410644B2

(12) United States Patent
Tamura et al.

(10) Patent No.: US 12,410,644 B2
(45) Date of Patent: Sep. 9, 2025

(54) DOOR LATCH DEVICE AND ACTUATOR

(71) Applicant: MITSUI KINZOKU ACT CORPORATION, Kanagawa (JP)

(72) Inventors: Shunsuke Tamura, Kanagawa (JP); Naoji Yamamoto, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 381 days.

(21) Appl. No.: 17/730,724

(22) Filed: Apr. 27, 2022

(65) Prior Publication Data

US 2022/0251886 A1 Aug. 11, 2022

Related U.S. Application Data

(63) Continuation of application No. PCT/JP2020/002710, filed on Jan. 27, 2020.

(30) Foreign Application Priority Data

Nov. 12, 2019 (JP) ................................ 2019-204785

(51) Int. Cl.
*E05B 85/26* (2014.01)
*E05B 81/06* (2014.01)

(52) U.S. Cl.
CPC .............. *E05B 85/26* (2013.01); *E05B 81/06* (2013.01)

(58) Field of Classification Search
CPC .......... E05B 95/26; E05B 81/06; E05B 81/42; E05B 81/30
USPC .......................................................... 292/194
See application file for complete search history.

(56) References Cited

U.S. PATENT DOCUMENTS

| | | | | |
|---|---|---|---|---|
| 11,486,174 B2 * | 11/2022 | Tanino | .................... | E05B 81/34 |
| 11,525,288 B2 * | 12/2022 | Schiffer | .................. | E05B 81/42 |
| 2015/0021934 A1 * | 1/2015 | Barmscheidt | ........... | E05B 81/90 292/336.3 |

(Continued)

FOREIGN PATENT DOCUMENTS

| | | |
|---|---|---|
| DE | 4240091 A1 | 6/1994 |
| JP | 2006225873 A | 8/2006 |
| JP | 6213927 B2 | 10/2017 |

OTHER PUBLICATIONS

International Search Report issued in corresponding International Patent Application No. PCT/JP2020/002710, dated Mar. 10, 2020, with English translation.

*Primary Examiner* — Kristina R Fulton
*Assistant Examiner* — James Edward Ignaczewski
(74) *Attorney, Agent, or Firm* — Rimon P.C.

(57) ABSTRACT

A door latch device includes: a rotating body; first and second levers; a lock mechanism on which an unlocking operation is performed and an open link is disposed in an unlocked position; and a latch mechanism. Further, the lock mechanism includes a lock lever which causes the open link to rotate when being operated by rotation of the rotating body, the rotating body is provided with two tilted walls so as to move the open link to the unlocked position when being rotated in one side from a reference position while the open link is disposed in a locked position, keep the open link in the unlocked position when being rotated in another side to the reference position while the open link is disposed in the unlocked position, and move the open link to the locked position when being further rotated in the another side.

4 Claims, 9 Drawing Sheets

(56) References Cited

U.S. PATENT DOCUMENTS

| | | | | |
|---|---|---|---|---|
| 2016/0201362 | A1* | 7/2016 | Mizuno | E05C 3/12 292/197 |
| 2017/0342749 | A1* | 11/2017 | Nelson | E05B 85/243 |
| 2021/0102412 | A1* | 4/2021 | Hayashi | E05B 81/16 |
| 2022/0120117 | A1* | 4/2022 | Ottino | E05B 77/54 |
| 2022/0381072 | A1* | 12/2022 | Cumbo | E05B 85/243 |

* cited by examiner

DOOR LATCH DEVICE AND ACTUATOR

CROSS-REFERENCE TO RELATED APPLICATION(S)

This application is a continuation of International Application No. PCT/JP2020/002710, filed on Jan. 27, 2020 which claims the benefit of priority of the prior Japanese Patent Application No. 2019-204785, filed on Nov. 12, 2019, the entire contents of which are incorporated herein by reference.

BACKGROUND

The present disclosure relates to a door latch device and an actuator.

A latch mechanism and a lock mechanism are normally disposed on a door latch device mounted on a vehicle. The latch mechanism is configured to maintain a closed state of a door with respect to a vehicle main body by engaging with a striker disposed on the vehicle main body, for example. The lock mechanism is configured to be switched between an unlocked state for releasing an engaging state of the latch mechanism in a case in which an operation of opening the door is performed with a door handle, and a locked state for maintaining the engaging state of the latch mechanism by invalidating the operation for the door handle. As such a type of door latch device, there has been developed a door latch device configured to perform an operation of releasing the engaging state of the latch mechanism and an operation of switching the locked state to the unlocked state by driving of a single actuator. More specifically, a rotating body, is rotated by a motor, the rotating body including a projecting part for causing the latch mechanism to operate disposed on one end face and a projecting part for causing the lock mechanism to operate disposed on an outer peripheral surface, and the projecting parts are respectively caused to work on the latch mechanism and the lock mechanism to successively perform an engagement release operation for the latch mechanism and an unlocking operation for the lock mechanism (for example, refer to Japanese Patent No. 6213927).

SUMMARY

There is a need for providing a door latch device and an actuator by which an increase of the size thereof can be prevented.

Accord in to an embodiment, a door latch device includes: a rotating body to be rotated and driven with respect to a case; a first lever and a second lever disposed to be rotatable with respect to the case, being configured to be operated by a cam part disposed on the rotating body; a lock mechanism on which an unlocking operation is performed so that an open link is arranged at an unlocked position in a case in which the first lever rotates; and a latch mechanism on which a release operation is performed in a case in which the second lever rotates. Further, the cam part is disposed only on one end face of the rotating body, and a first cam to operate the first lever and a second cam to operate the second lever are individually disposed in the cam part, the lock mechanism includes a lock lever to be operated in accordance with rotation of the rotating body to rotate the open link, and the rotating body includes two tilted walls to cause the open link to move to the unlocked position via the lock lever in a case in which the rotating body rotates in one direction from a reference position in a state in which the open link is arranged at a locked position, maintain the open link at the unlocked position in a case in which the rotating body rotates in another direction to return to the reference position from a state in which the open link is arranged at the unlocked position, and cause the open link to move to the locked position in a case in which the rotating body further rotates in the another direction from the reference position.

According to an embodiment, an actuator includes: a rotating body configured to be rotated and driven with respect to a case; and a first lever and a second lever that are disposed to be able to rotate with respect to the case, and configured to be operated by a cam part disposed on the rotating body. Further, the cam part is disposed only on one end face of the rotating body, and a first cam configured to operate the first lever and a second cam configured to operate the second lever are individually disposed in the cam part, and a starting end of a cam surface of the second cam is disposed to be closer to an outer peripheral side than a starting end of a cam surface of the first cam is, and an increasing ratio of an outer diameter of the cam surface of the second cam is set to be smaller than an increasing ratio of an outer diameter of the cam surface of the first cam.

BRIEF DESCRIPTION OF THE DRAWINGS

FIG. 7A is an end face diagram;

FIG. 7B is a perspective view;

FIG. 8A is a diagram illustrating a basic state in which the cam wheel is at a reference position;

FIG. 8B is a diagram illustrating a state in which the cam wheel normally rotates from the reference position by substantially 100 degrees;

FIG. 9A is a diagram illustrating a basic state in which the cam wheel is at the reference position;

FIG. 9B is a diagram illustrating a state in which the cam wheel reversely rotates from the reference position by substantially 40 degrees;

FIG. 9C is a diagram illustrating a state in which the cam wheel normally rotates by substantially 40 degrees from the state of FIG. 9B; and FIG. 9D is a diagram illustrating a state in which the cam wheel normally rotates by substantially 40 degrees from the state of FIG. 9C.

DETAILED DESCRIPTION

With the door latch device in the related art, the release operation for the latch mechanism and the unlocking operation for the lock mechanism can be performed by a single motor, so that there are advantages such that the number of components can be reduced, for example. However, components such as a lever to be engaged with the projecting part to be operated are required to be disposed in a region opposed to the end face of the rotating body and a region opposed to the outer peripheral surface of the rotating body, so that the size of the device may be increased.

The following describes a preferred embodiment of a door latch device according to the present disclosure in detail with reference to the attached drawings.

Figure 1:
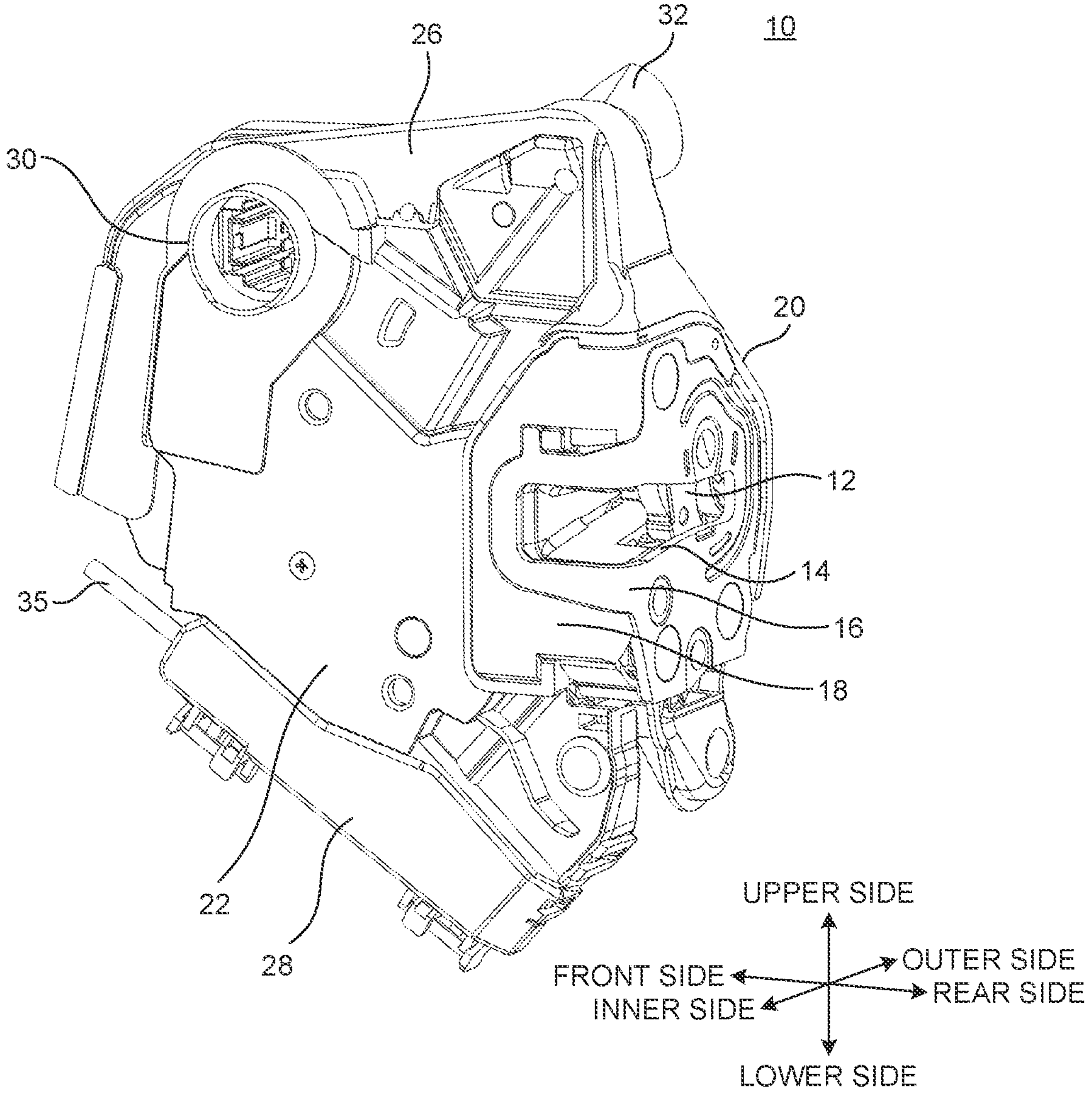
FIG. 1 is a perspective view of a door latch device according to an embodiment of the present disclosure viewed from an outer side and an obliquely rear side of a vehicle.
Figure 2:
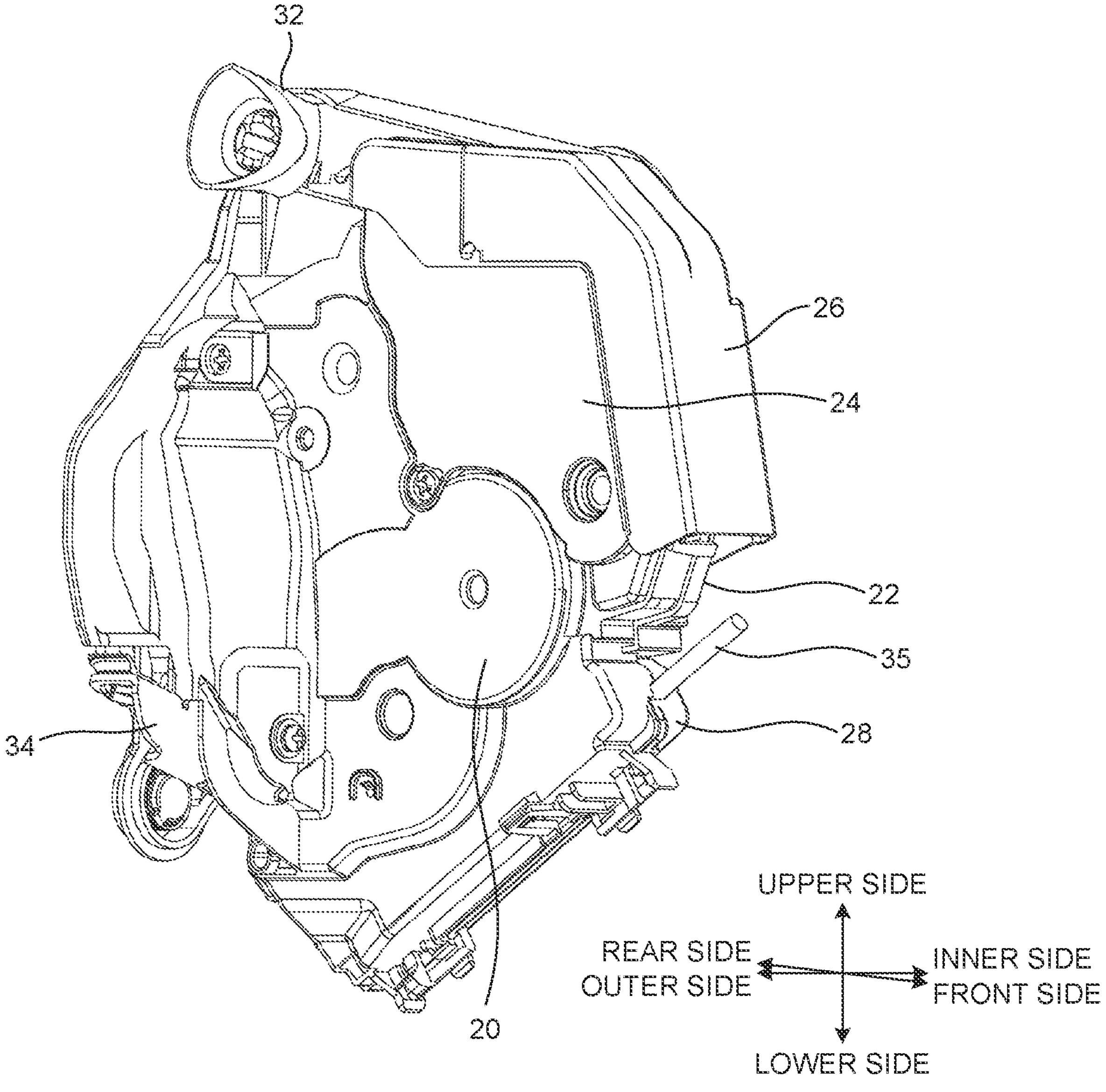
FIG. 2 is a perspective view of the door latch device viewed from the outer side and an obliquely front side of the vehicle.
Figure 3:
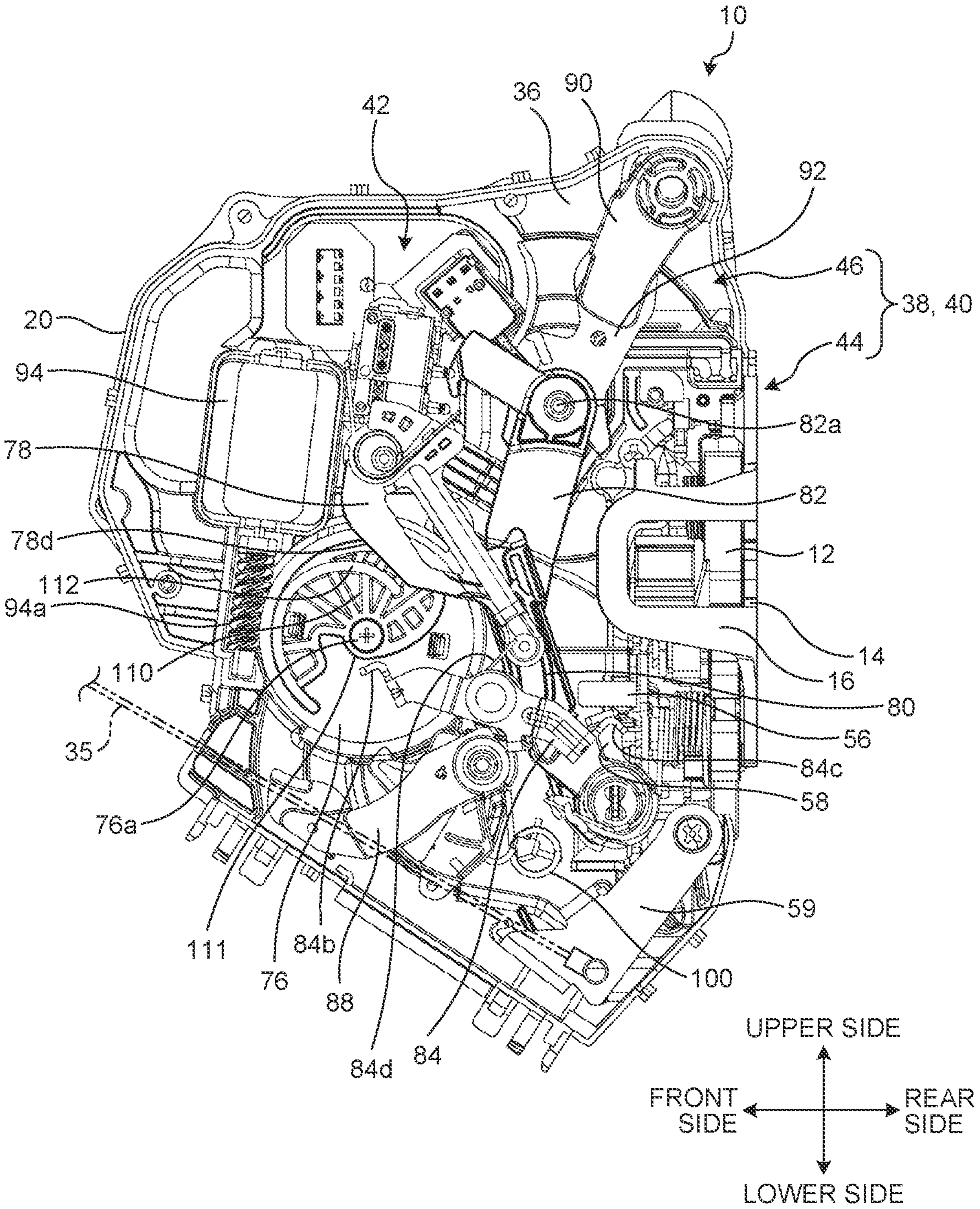
FIG. 3 is a side view illustrating an inner part of the door latch device.

FIG. 1 to FIG. 3 are diagrams illustrating the door latch device according to the embodiment of the present disclosure. Although not illustrated in the drawings, the door latch device exemplified herein is mounted on a side door disposed on the right side of a four-wheeled automobile, and performs opening/closing control for the side door by changing an engaging state with a striker disposed on a vehicle main body in accordance with an opening/closing operation with a door handle or a locking/unlocking operation with a key.

As illustrated in FIG. 1 and FIG. 2, in a door latch device 10, a latch member 12 for latching the striker is disposed in the rear of a striker entry groove 14. The latch member 12 is part of a latch mechanism 44 (described later). The striker entry groove 14 is formed as part of a cover plate 16. A body 18 is disposed around the cover plate 16. A vehicle inner side and a vehicle rear side of the latch mechanism 44 are covered by the cover plate 16 and the body 18.

The door latch device 10 is covered by a case 20, a first cover 22, and a second cover 24 in addition to the cover plate 16 and the body 18. The case 20 mainly covers a vehicle outer side, the first cover 22 mainly covers the vehicle inner side, and the second cover 24 further covers a front upper part on the vehicle inner side of the case 20. The cover plate 16, the body 18, the case 20, the first cover 22, and the second cover 24 constitute a housing of the door latch device 10.

The door latch device 10 further includes a waterproof cover 26 that covers an upper part, a cable cover 28 on a lower part on the vehicle inner side, a coupler 30 disposed on an upper part on the vehicle inner side, and a key cylinder coupling part 32 disposed on an upper part on the vehicle outer side. The waterproof cover 26 covers a boundary part between the case 20 and the first cover 22, and prevents infiltration of water. The cable cover 28 covers a connecting portion for a cable 35. The cable 35 links the door latch device 10 with an inner handle (not illustrated). The coupler 30 is connected to a harness connector (not illustrated). The key cylinder coupling part 32 is a portion to be operated when a key is inserted therein. On a portion positioned on the vehicle outer side of the door latch device 10, an end part of art outer lever 34 connected to an outer handle (not illustrated) is disposed to project toward the outside.

As illustrated in FIG. 3, an accommodation space 36 is formed on the vehicle inner side of the door latch device 10. The accommodation space 36 is a region in which the vehicle outer side is covered by the case 20, and the vehicle inner side is mainly covered by the first cover 22. The vehicle inner side of the accommodation space 36 is also covered by the cover plate 16, the body 18, and the cable cover 28 in addition to the first cover 22.

The accommodation space 36 briefly includes a mechanism region 40 in which the machine mechanism 38 is disposed, and an electric component region 42 in which electric components are disposed. The electric component region 42 occupies an upper part on the vehicle front side, and the mechanism region 40 occupies a residual portion. The machine mechanism 38 houses the latch mechanism 44 that latches and unlatches the striker by the latch member 12, and a lock mechanism. 46 that is switched between a locked state and an unlocked state. The latch mechanism 44 is disposed on the vehicle rear side in the accommodation space 36, and covered by the cover plate 16 and the body 18.

The machine mechanism 38 houses an electric release unit that can release, by power of a motor 94, a latched state of the striker by the latch mechanism 44, and a manual release unit that can release, by manual operation, the latched state of the striker by the latch mechanism 44. The electric release unit includes the motor 94, a cam wheel (rotating body) 76, and the like (described later) to unlatch the striker. The manual release unit unlatches the striker via an inner lever 59 (described later) and the outer lever 34 mechanically linked with a manual operation.

Figure 4:
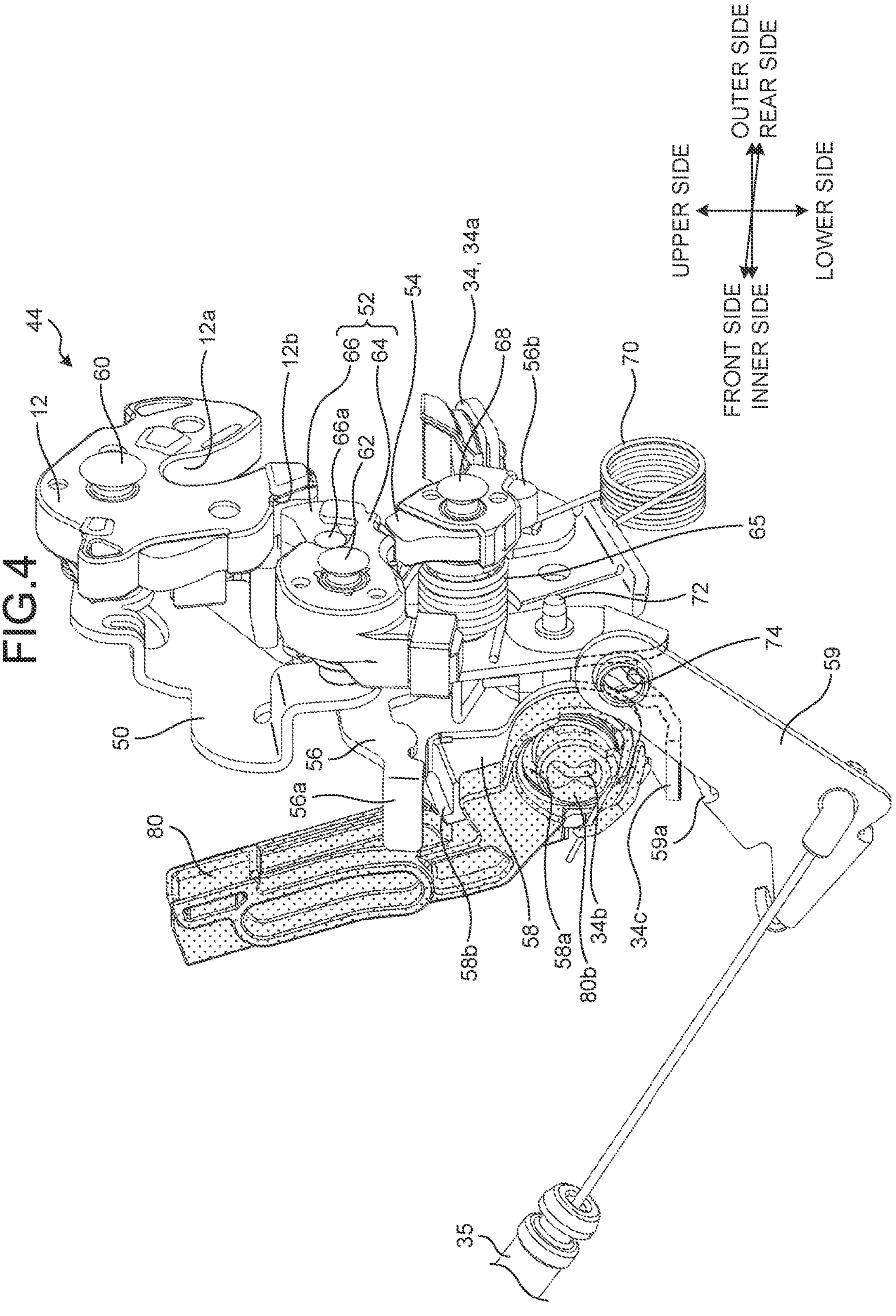
FIG. 4 is a perspective view of a latch mechanism.

As illustrated in FIG. 4, the latch mechanism 44 includes a base bracket 50, a ratchet 52, a ratchet holder 54, a ratchet lever 56, an anti-panic lever 58, and the inner lever 59 in addition to the latch member 12 and the outer lever 34 described above. The respective elements of the latch mechanism 44 are supported by the base bracket 50.

The latch member 12 is supported by the housing via a latch shaft 60 in a rotatable manner, and includes a striker engagement groove **12*a* and a ratchet engagement part 12*b*. When the striker enters the striker engagement groove 12*a* in accordance with a door-closing operation from a door-opened state, the latch member 12 rotates against elastic force of a spring (not illustrated), and the ratchet 52 engages with the ratchet engagement part 12*b*** to latch the striker at a full-latch position.

The ratchet 52 includes a base lever 64 supported by the housing via a ratchet shaft 62 in a rotatable manner, and a pole lever 66 supported by the base lever 64 via a base shaft part **66*a* in a rotatable manner. The base lever 64 is elastically energized by a base spring 65. The pole lever 66 is bent in a predetermined angle range with respect to the base lever 64. A substantially straight attitude or the ratchet 52 is held by being supported by the ratchet holder 54 from a lateral side, and a distal end of the pole lever 66 engages with the ratchet engagement part 12*b* to hold the latch member 12** at the full latch position.

The ratchet holder 54 is supported by the housing via a shaft part 68 in a rotatable manner, and elastically energized by a holder spring 70 to support a lateral side of the base lever 64. The ratchet holder 54 rotates against elastic force of the holder spring 70 when the ratchet lever 56 rotates, and is separated from the base lever 64. When the ratchet holder 54 is separated from the base lever 64, the base lever 64 and the pole lever 66 of the ratchet 52 are caused to be in a buckling state centered on the base shaft part **66*a*, and the pole lever 66 leaves the ratchet engagement part 12*b* to open the latch member 12. As a result, the latch member 12 is rotated by elastic force of a spring (not illustrated), and the striker is unlatched. In a case of operating the ratchet 52 via the ratchet holder 54, the operation can be performed with smaller force as compared with a case of directly operating the ratchet 52**.

The ratchet lever 56 is supported by the base bracket 50 in a rotatable manner, and includes a passive part **56*a* projecting toward the vehicle inner side with respect to a rotation axis and a rotation working part 56*b* projecting toward the vehicle outer side with respect to the rotation axis. In the ratchet lever 56, the rotation working part 56*b* causes the ratchet holder 54 to rotate when the passive part 56*a*** moves toward the upper side.

The outer lever 34 is supported by the housing via a shaft part 72 in a rotatable manner, and includes a handle operation part 34*a* projecting toward the vehicle outer side with respect to the shaft part 72, and a working part 34*b* and a lever passive piece 34*c* projecting toward the vehicle inner side with respect to the shaft part 72. The handle operation part 34*a* is a portion operated by the outer handle. The working part 34*b* is inserted into a hole 58*a* of the anti-panic lever 58 and an odd-form hole 80*b* of an open link 80 (described later). The lever passive piece 34*c* is disposed on a lower side of the working part 34*b*, and operated by the inner lever 59. The outer lever 34 is rotated by an operation of the handle operation part 34*a* or the lever passive piece 34*c*, and pushes up the anti-panic lever 58.

The inner lever 59 is supported by the housing via the shaft part 74 in a rotatable manner, and is rotated by an operation of the cable 35. Accordingly, an operation piece 59*a* pushes up the lever passive piece 34*c*.

The anti-panic lever 58 includes the hole 58*a* into which the working part 34*b* is inserted, and a working piece 56*b* that is bent at an upper part. The anti-panic lever 58 is pushed up by the working part 34*b* when the open link 80 (described later) is at an unlocked position and the outer lever 34 rotates, and the working piece 56*b* pushes up the passive part 56*a* of the ratchet lever 56. Accordingly, the ratchet holder 54 and the ratchet 52 perform an unlatch operation. The anti-panic lever 58 has a structure separated from the open link 80 due to an anti-panic mechanism.

Figure 5:
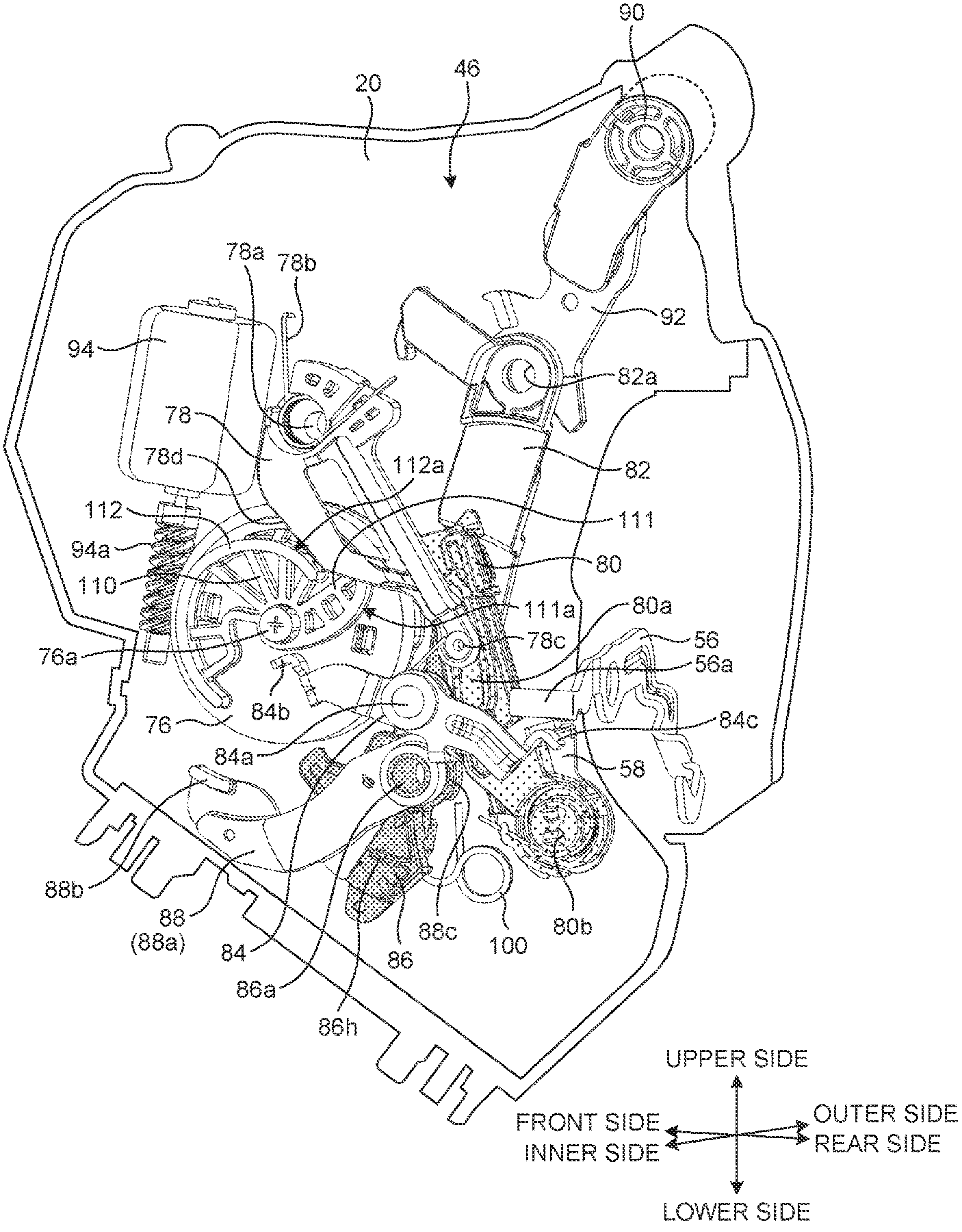
FIG. 5 is a perspective view of a lock mechanism viewed from an obliquely inner and rear side.
Figure 6:
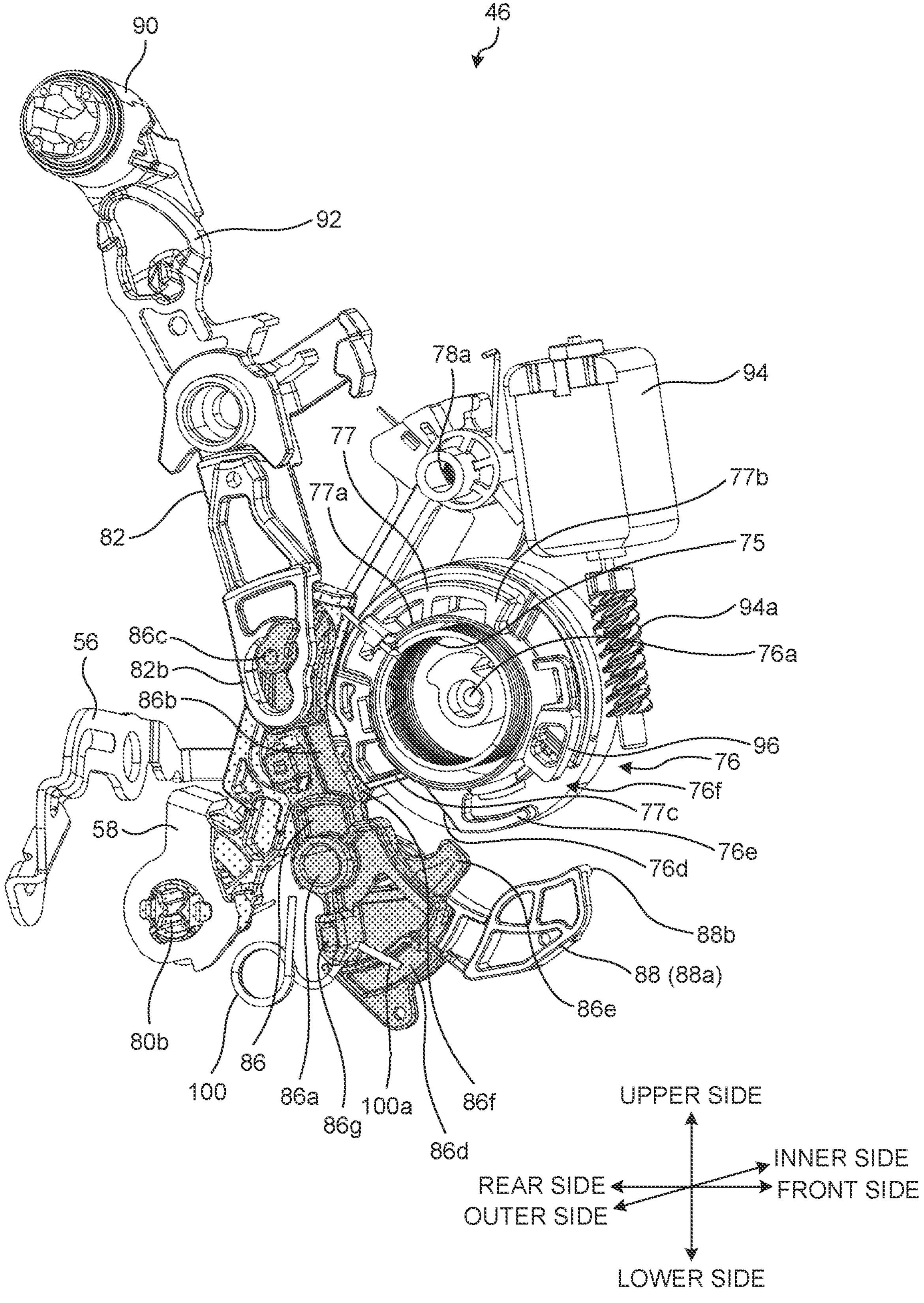
FIG. 6 is a perspective view of the lock mechanism viewed from an obliquely outer and front side.

As illustrated in FIG. 5 and FIG. 6, the lock mechanism 46 includes a cam wheel 76 supported by the housing via a shaft part 76*a* in a rotatable manner, a knob lever (first lever) 78 that is supported by the housing via a shaft part 78*a* in a rotatable manner and driven by the cam wheel 76, the open link 80 that is driven by the knob lever 78, a sub-lock lever 82 linked with the open link 80, and an open lever (second lever) 84 that is supported by the housing via a shaft part 84*a* in a rotatable manner and driven by the cam wheel 76. The lock mechanism 46 further includes a lock lever 86 and an auxiliary lever 88 linked with the sub-lock lever 82, and a key lever 90 and a sub-key lever 92 that are linked with a key operation and drive the sub-lock lever 82. To easily identify components in the respective drawings, the lock lever 86 is represented by fine dots, and the open link 80 is represented by coarse dots.

The cam wheel 76 has a disk shape having teeth (not illustrated) on an outer peripheral surface, meshes with a worm 94*a* disposed on a drive shaft of the motor 94 via the teeth on the outer peripheral surface, and can rotate in a case in which the motor 94 is driven. In the following description, for convenience' sake, a case in which the cam wheel 76 rotates clockwise in FIG. 5 is assumed to be normal rotation, and a case in which the cam wheel 76 rotates counterclockwise is assumed to be reverse rotation.

A cam part 110 is disposed on the cam wheel 76. The cam part 110 is disposed only on an end face 76*b* positioned on the vehicle inner side of the cam wheel 76 (hereinafter, simply referred to as an inner end face 76*b*), and projects toward the vehicle inner side. A first cam 111 and a second cam 112 are disposed on the cam part 110. Cam surfaces 111 and 112*a* having different shapes are disposed on respective outer circumferences of the first cam 111 and the second cam 112. Each of the cam surfaces 111*a* and 112*a* is formed so that a distance from the center of the cam wheel 76 is increased when the cam wheel 76 rotates counterclockwise.

Figure 7A:
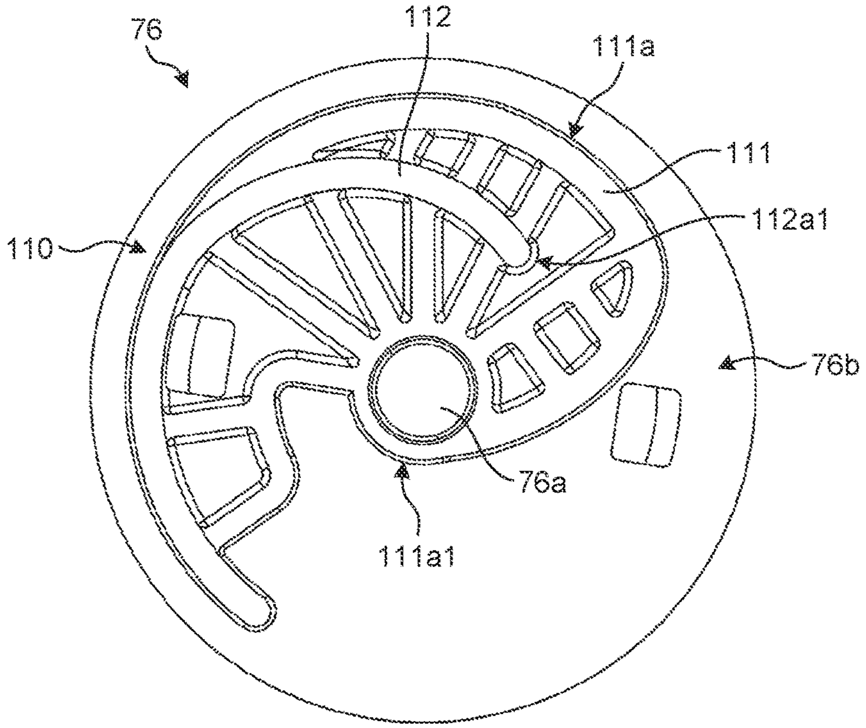
FIGS. 7A and 7B illustrate a cam wheel.
Figure 7B:
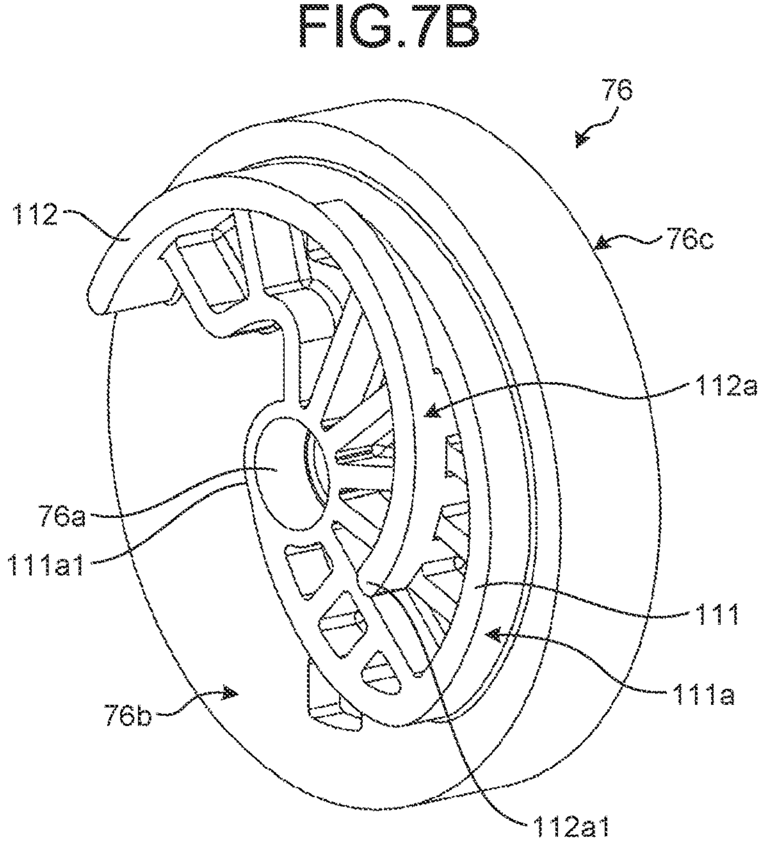

More specifically, as illustrated in FIG. 5 and FIGS. 7A and 7B, regarding the cam surface 111*a* of the first cam 111 positioned on a side close to the inner end face 76*b* of the cam wheel 76 in the cam part 110, a minimum outer diameter portion close to a center part of the cam wheel 76 is assumed to be a starting end 111*a*1, and the cam surface 111*a* extends in a direction of rotating counterclockwise in FIGS. 7A and 7B. In the example illustrated in FIGS. 7A and 7B, the cam surface 111*a* of the first cam 111 is disposed in a range of substantially 270 degrees from the starting end 111*a*1. As is clear from FIGS. 7A and 7B, the cam surface 111*a* of the first cam 111 is configured to have a distance from the center that is gradually increased in a range of substantially 100 degrees from the starting end 111*a*1, and to be a circular arc having a fixed cuter diameter after the range of 100 degrees. A maximum outer diameter of the cam surface 111*a* of the first cam 111 is set at a distance with which the open lever 84 (described later) can rotate counterclockwise to the maximum in FIG. 5 to perform an unlatch operation on the ratchet holder 54 and the ratchet 52 via the ratchet lever 56.

On the other hand, regarding the cam surface 112*a* of the second cam 112 positioned on a side separated from the inner end face 76*b* of the cam wheel 76 in the cam part 110, a position rotated counterclockwise from the starting end 111*a*1 of the first cam 111 by substantially 120 degrees is assumed to be a starting end 112*a*1, and the cam surface 112*a* extends in a direction of rotating counterclockwise in FIGS. 7A and 7B. In the example illustrated in FIGS. 7A and 7B, the cam surface 112*a* of the second cam 112 is configured to have a distance from the center that is gradually increased in a range of substantially 100 degrees from the starting end 112*a*1, and to be a circular arc having a fixed outer diameter that is the same as that of the cam surface 111*a* of the first cam all after the range of 100 degrees. A maximum outer diameter of the cam surface 112*a* of the second cam 112 is set at a distance with which the knob lever 78 (described later) can rotate counterclockwise to the maximum in FIG. 5 and the open link 80 is caused to have an erect attitude.

The starting end 112*a*1 of the cam surface 112*a* of the second cam 112 is disposed to be closer to an outer peripheral side than the starting end 111*a*1 of the cam surface 111*a* of the first cam 111 is, and an increasing ratio of the outer diameter of the cam surface 112*a* of the second cam 112 is smaller than an increasing ratio of the outer diameter of the cam surface 111*a* of the first cam 111.

As illustrated in FIG. 6, the cam wheel 76 includes an auxiliary component 77 on an end face 76*c* positioned on the vehicle cuter side (hereinafter, simply referred to as an outer end face 76*c*). The auxiliary component 77 is integrally attached to the cam wheel 76 in a state of being prevented from relatively rotating. A torsion coil spring (elastic member) 75 is disposed inside a cylindrical part 77*a* formed by the auxiliary component 77. The torsion coil spring 75 is configured to have a cylindrical coil part by winding a metal fine wire, one spring end part is engaged with the cam wheel 76, and the other spring end part is engaged with the case 20. The torsion coil spring 75 allows the cam wheel 76 to normally rotate and reversely rotate with respect to the case 20 in a case in which external force is applied to the cam wheel 76, while energizing the cam wheel 76 to be maintained at a neutral reference position in a case in which external force is removed.

The auxiliary component 77 includes a regulating projection 77*b* projecting toward the vehicle inner side in the vicinity of an outer circumference, and a first tilted wall 77*c* that is disposed on a substantially opposite side of the regulating projection 77*b*. The regulating projection 77*b* abuts on an elastic member 96*a* of a rotation stopper 96 disposed in the case 20 to regulate rotation of the cam wheel 76 when the cam wheel 76 reversely rotates. The first tilted wall 77*c* is tilted from an outer peripheral surface of the cylindrical part 77*a* toward an outer peripheral side to be gradually positioned on a clockwise direction side in FIG. 6. The first tilted wall 77*c* is disposed to secure a gap between itself and the outer end face 76*c* of the cam wheel 76.

The cam wheel 76 further includes a second tilted wall 76*d* and a holding wall 76*e*. The second tilted wall 76*d* is tilted from the outer peripheral surface of the cylindrical part. 77*a* of the auxiliary component 77 toward the outer peripheral side to be gradually positioned on a counterclockwise direction side in FIG. 6. The first tilted wall 77*c* and the second tilted wall 76*d* extend to be gradually separated from each other from a position close to the cylindrical part 77*a* toward the outer peripheral side. The first tilted wall 77*c* of the auxiliary component 77 is disposed to be closer to the vehicle outer side than the second tilted wall 76*d* is. The holding wall 76*e* is a circular arc wall extending from a portion positioned on the outer peripheral side of the second tilted wall 76*d* toward the counterclockwise direction in FIG. 6. As illustrated in FIG. 6, an end part on the clockwise direction side of the holding wall 76*e* is closed by a portion constituting the second tilted wall 76*d*, while an end part on the counterclockwise direction side thereof is adjacent to a notch 76*f* opening on the outer peripheral surface of the cam wheel 76.

As illustrated in FIG. 5, a follower surface 78*d* that abuts on the cam surface 112*a* of the second cam 112 in the cam part 110 is disposed on the knob lever 78. The follower surface 78*d* is driven by the second cam 112 when the cam wheel 76 normally rotates, and functions to cause the knob lever 78 to rotate counterclockwise against a lever spring 78*b*. A knob 78*c* is disposed at a distal end part of the knob lever 78. The knob 78*c* engages with a side surface guide groove 80*a* disposed on the open link 80. The knob lever 78 functions such that, when being rotated counterclockwise in FIG. 5, the knob 78*c* moves toward the upper side along the side surface guide groove 80*a* to erect the tilted open link 80, and when being rotated clockwise in FIG. 5, the knob 78*c* moves toward a lower side along the side surface guide groove 80*a* to cause the erect open link 80 to be tilted toward the vehicle front side.

The open link 80 includes the odd-form hole 80*b* at a lower end, and rotates about the lower end as a center to be switched between an erect attitude (unlocked position) and a tilted attitude (locked position) as described above. The lock mechanism 46 is caused to be in the locked state in a case in which the open link 80 is arranged at the locked position illustrated in FIG. 5, and the lock mechanism 46 is caused to be in the unlocked state in a case in which the open link 80 is arranged at the unlocked position. That is, when the open link 80 is at the locked position, the anti-panic lever 58 is tilted together with the open link 80, so that the anti-panic lever 58 does not abut on the ratchet lever 56 even in a case of being lifted up by the outer lever 34. Thus, the ratchet lever 56 does not operate, and the door is kept closed in the locked state. On the other hand, when the open link 80 is at the unlocked position, the anti-panic lever 58 erects together with the open link 80, so that the anti-panic lever 58 abuts on and pushes up the ratchet lever 56 when being lifted up by the outer lever 34. Accordingly, the ratchet lever 56 operates, and the unlocked state in which the door can be opened is caused.

The working part 34*b* of the outer lever 34 is inserted into the odd-form hole 80*b* of the open link 80. In a case in which the outer lever 34 operates, the open link 80 moves along an upper and lower direction. The anti-panic lever 58 is assembled to the lower end part of the open link 80. The anti-panic lever 58 moves integrally with the open link 80.

The sub-lock lever 82 is supported by the housing via a shaft part 82*a* in a rotatable manner, engaged with the lock lever 86 via an outer knob 86*c* of the lock lever 86, and engaged with the open link 80 arranged at the locked position via an inner knob 86*i*. That is, when the sub-lock lever 82 rotates counterclockwise in FIG. 5 due to rotation of the key lever 90 and the sub-key lever 92, the lock lever 86 rotates clockwise in FIG. 5 via the outer knob 86*c*, and the lock lever 86 is pushed out by the inner knob 86*i* to cause the open link 80 to be at the unlocked position. In a case in which the sub-lock lever 82 rotates clockwise and returns to an original position, the open link 80 is returned to the locked position by the knob lever 78 that rotates clockwise in FIG. 5 by elastic force of the lever spring 78*b*.

The open lever 84 is a constituent element of the electric release unit. That is, the open lever 84 operates to open the door in a case in which the motor 94 is driven by a switch operation and the like performed by a driver, and includes a cam follower part 84*b* extending from the shaft part 84*a* toward the vehicle front side and a ratchet operation part 84*c* extending toward the vehicle rear side. An open spring 84*d* is disposed between the open lever 84 and the housing. The open spring 84*d* energizes the cam follower part 84*b* in the clockwise direction in FIG. 5 to abut on the cam surface 111*a* of the first cam 111 in the cam part 110 of the cam wheel 76. In a case in which the cam wheel 76 normally rotates in FIG. 5, the first cam 111 pushes down the cam follower part 84*b*, the open lever 84 rotates counterclockwise about the shaft part 84*a* against the open spring 84*d*, and the ratchet operation part 84*c* moves upward. When the ratchet operation part 84*c* moves upward, the passive part 56*a* of the ratchet lever 56 is pushed up, the latch mechanism 44 is unlatched, and the door is opened. When the cars wheel 76 returns to the neutral reference position, the open lever 84 also returns to an original attitude by the open spring 84*d*.

The open lever 84 can operate the ratchet lever 56 independently of the open link 80. Thus, with the door latch device 10 including the open lever 84, the door can be opened by the electric release unit even when the lock mechanism 46 is in the locked state (that is, the open link 80 is at the locked position).

As illustrated in FIG. 6, the lock lever 86 includes an arm 86*b* that is supported by the housing in a rotatable manner via a shaft part 86*a* and extends toward the upper side, the outer knob 86*c* projecting from a distal end of the arm 86*b* toward the vehicle outer side, a downward extending part 86*d* extending toward the lower side, a first projection 86*e* projecting from the downward extending part 86*d* toward the vehicle front side, a second projection 86*f* projecting from the vicinity of the shaft part 86*a* of the arm 861 toward the vehicle front side, a spring reception part 86*g* projecting from the downward extending part 86*d* toward the vehicle outer side, and two push-out parts 86*h* projecting from a surface on the vehicle inner side of the downward extending part 86*d* toward the inner side of the vehicle. The outer knob 86*c* is engaged with the sub-lock lever 82 by being fit into a guide hole 82*b* formed at the lower end of the sub-lock lever 82. The lock lever 86 is rotated via the outer knob 86*c* when the sub-lock lever 82 rotates, and can be displaced between a working position for switching the open link 80 from the locked position to the unlocked position, and a non-working position not working on the open link 80.

The spring reception part 86*g* abuts on a bent part 100*a* of a lock spring 100. The lock spring 100 defines an attitude of the sub-lock lever 82 via the spring reception part 86*g*.

The first projection 86*e* abuts on the first tilted wall 77*c* in a case in which the cam wheel 76 rotates counterclockwise in FIG. 6. When the cam wheel 76 continuously rotates counterclockwise in a state in which the first tilted wall 77*c* abuts on the first projection 86*e*, the lock lever 86 rotates clockwise in FIG. 6. The second projection 86*f* abuts on the second tilted wall 76*d* in a case in which the cam wheel 76 rotates clockwise in FIG. 6. When the cam wheel 76 continuously rotates clockwise in a state in which the second tilted wall 76*d* abuts on the second projection 86*f*, the lock lever 86 rotates counterclockwise in FIG. 6. The second projection 86*f* is disposed to be closer to the vehicle inner side than the first tilted wall 77*c* is. The second projection 86*f* enters a gap between the first tilted wall 77*c* and the outer end face 76*c* of the cam wheel 76, and does not abut on the first tilted wall 77*c*. The two push-out parts 86*h* abut on the auxiliary lever 88 in a case in which the lock lever 86 rotates clockwise in FIG. 5.

As illustrated in FIG. 5, the auxiliary lever 88 is supported by the shaft part 86*a* of the lock lever 86 in a rotatable manner, and includes an arm 88*a* projecting from the shaft part 86*a* toward the vehicle front side, and a circular arc projection 88*b* disposed on an upper part of a distal end of the arm 88*a*. The circular arc projection 88*b* abuts on the holding wall 76*e* of the cam wheel 76 in a case of rotating counterclockwise in FIG. 6. An auxiliary lever spring 88*c* is interposed between the auxiliary lever 88 and the lock lever 86, the auxiliary lever spring 88*c* energizing the auxiliary lever 88 in a direction of rotating counterclockwise in FIG. 5 with respect to the lock lever 86. A lower surface of the auxiliary lever 88 is kept abutting on the push-cut parts 86*h* due to elastic force of the auxiliary lever spring 88*c*.

Figure 8B:
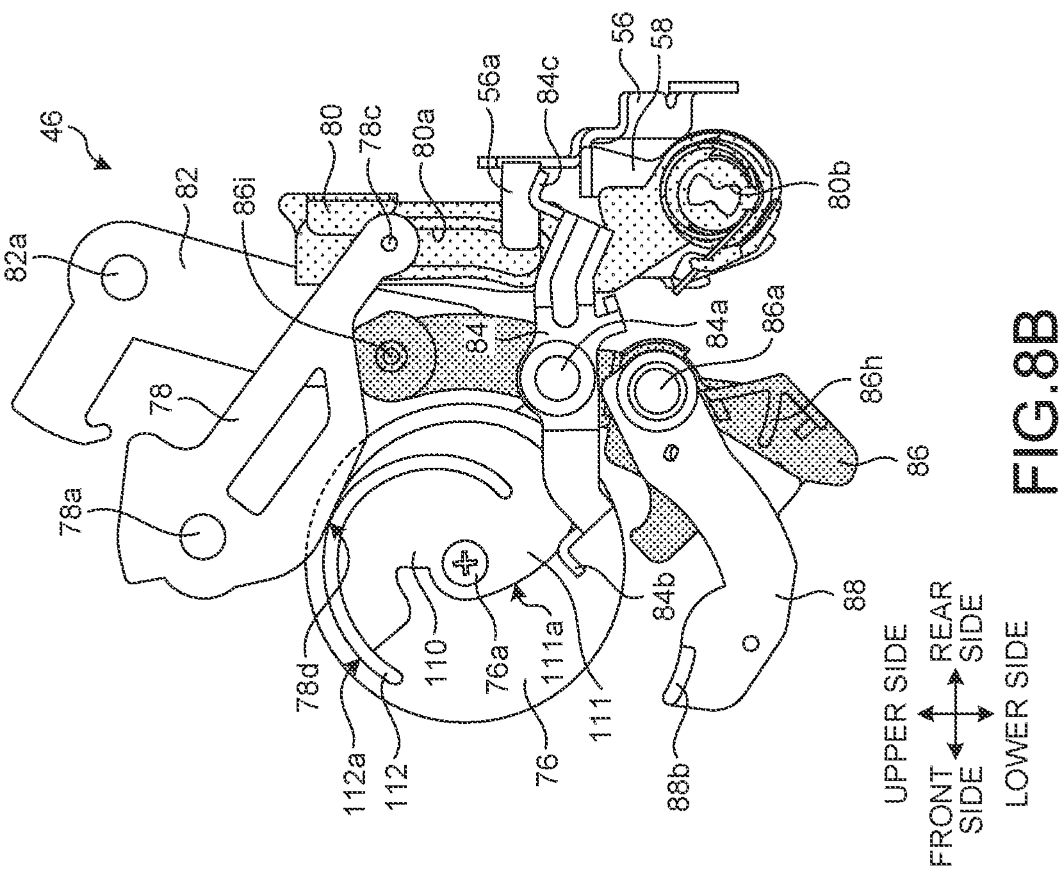
FIGS. 8A and 8B are a diagram illustrating an operation of the lock mechanism viewed from an inner side of the vehicle when the cam wheel normally rotates.
Figure 8A:
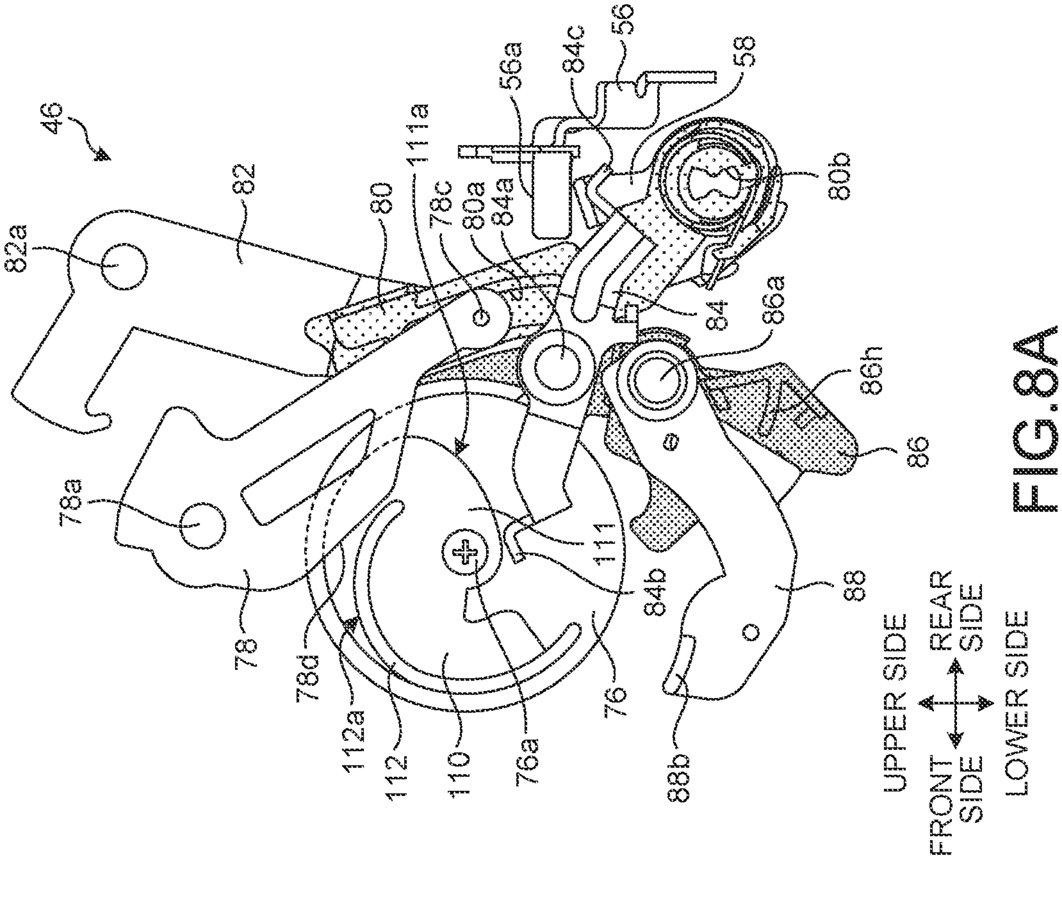

FIGS. 8A and 8B are diagrams illustrating an operation of the lock mechanism 46 viewed from the vehicle inner side when the cam wheel 76 normally rotates (rotates clockwise in FIGS. 8A and 8B). The following describes the operation of the lock mechanism 46 with reference to these drawings as appropriate.

As illustrated in FIG. 8A, in a basic state in which the cam wheel 76 is at the reference position, the cam surface 112*a* of the second cam 112 is separated from the follower surface 78*d* of the knob lever 78, and the cam follower part 84*b* is separated from the cam surface 111*a* of the first cam 111 at a position where the open lever 84 rotates clockwise to the maximum. At this point, the open link 80 is arranged at the locked position, and the knob 78*c* of the knob lever 78 is positioned on a lower side of the side surface guide groove 80*a*.

When the cam wheel 76 starts to normally rotate by being driven by the motor 94 from the basic state, a portion in the vicinity of the starting end 112*a*1 of the cam surface 112*a* of the second cam 112 abuts on the follower surface 78*d* of the knob lever 78, and the knob lever 78 starts to rotate counterclockwise in FIGS. 8A and 8B. Substantially at the same time, a portion in the vicinity of the starting end 111*a*1 of the cam surface 111*a* of the first cam 111 abuts on the cam follower part 84*b* of the open lever 84, and the open lever 84 starts to rotate counterclockwise in FIGS. 8A and 8B.

As described above, the increasing ratio of the outer diameter of the cam surface 111*a* of the first cam 111 is larger than that of the cam surface 112*a* of the second cam 112. Thus, in a case in which the cam wheel 76 normally rotates, as illustrated in FIG. 8B, the passive part 56*a* of the ratchet lever 56 is sufficiently pushed up by the open lever 84 at an early stage, the latch mechanism 44 unlatches the striker, and the door is opened. On the other hand, the knob lever 78 is caused to be in a state of being rotated counterclockwise to the maximum by the cam surface of the second cam 112, the open link 80 gradually rotates clockwise when the knob 78*c* moves toward the upper side along the side surface guide groove 80*a*, and the open link 80 is caused to be at the unlocked position. The sub-lock lever 82, the lock lever 86, and the auxiliary lever 88 do not operate in this period, and are maintained in the basic state in FIG. 8A.

During the operation described above, the torsion coil spring 75 interposed between the case 20 and the cam wheel 76 is gradually bent. Thus, when electric supply to the motor 94 is stopped thereafter, the cam wheel 76 rotates counterclockwise to be at the reference position due to elastic force of the torsion coil spring 75, and the lock mechanism 46 returns to the basic state illustrated in FIG. 8A.

At the time of such electric release, as illustrated in FIG. 8A and FIG. 8B, the open lever 84 can be rotated by being driven by the motor 94 to work on the latch mechanism 44 to unlatch the striker. At this point, the open link 80 also reciprocates between the locked position and the unlocked position. The open link 80 does not work on the other components, but synchronously operates at appropriate time intervals at the time of electric release, so that it is possible to prevent grease from being hardened due to long-term deterioration, or prevent a spring, a lever, and the like made of steel material from getting rusty. Accordingly, a smooth operation of the lock mechanism 46 can be secured at all times.

At the time of electric release, only the open link 80 synchronously operates, and the lock lever 86 does not operate. Thus, the spring reception part 86*g* of the lock lever 86 does not get over the bent part 100*a*, and sound is not generated, so that a user does not feel a sense of incongruity.

FIGS. 9A to 9D are diagrams illustrating an operation of the lock mechanism 46 viewed from the vehicle outer side when the cam wheel 76 reversely rotates (rotates clockwise in FIGS. 9A to 9D) and normally rotates (rotates counterclockwise in FIGS. 9A to 9D). The following further describes the operation of the lock mechanism 46 with reference to the drawings as appropriate.

Figure 9A:
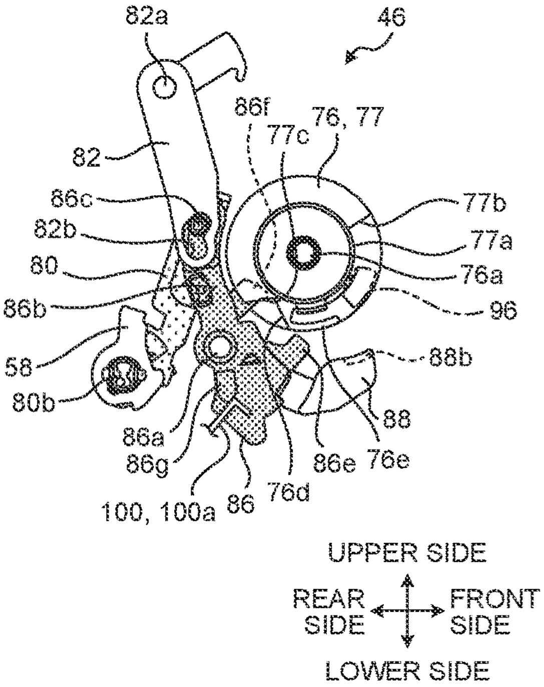
FIGS. 9A, 9B, 9C, and 9D are diagrams illustrating the operation of the lock mechanism viewed from the outer side of the vehicle when the cam wheel reversely rotates and normally rotates.

As illustrated in FIG. 9A, in the basic state in which the cam wheel 76 is arranged at the reference position, the lock lever 86 is at a position where the lock lever 86 rotates clockwise to the maximum, and the first projection 86*e* and the second projection 86*f* are in a non-abutting state with respect to the cam wheel 76.

Figure 9B:
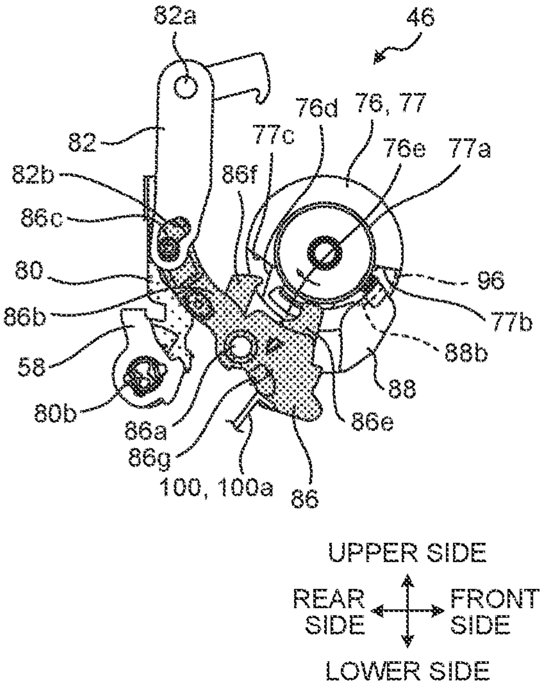

When the cam wheel 76 starts to reversely rotate by being driven by the motor 94 from the reference state, and rotation of the cam wheel 76 proceeds to substantially 40 degrees as illustrated in FIG. 9B, the second tilted wall 76*d* of the cam wheel 76 abuts on the second projection 86*f*. Accordingly, the lock lever 86 rotates counterclockwise, and the spring reception part 86*g* is displaced to get over the bent part 100*a* of the lock spring 100.

When the lock lever 86 rotates, the sub-lock lever 82 is rotated clockwise via the outer knob 86*c*, the open link 80 is rotated counterclockwise via the inner knob 86*i*, and the auxiliary lever 88 is rotated counterclockwise by the push-out parts 86*h*. Accordingly, each of the sub-lock lever 82 and the open link 80 is caused to be at the unlocked position, and the circular arc projection 88*b* of the auxiliary lever 86 is displaced to a position close to the cylindrical part 77*a* via the notch 76*f*.

Figure 9C:
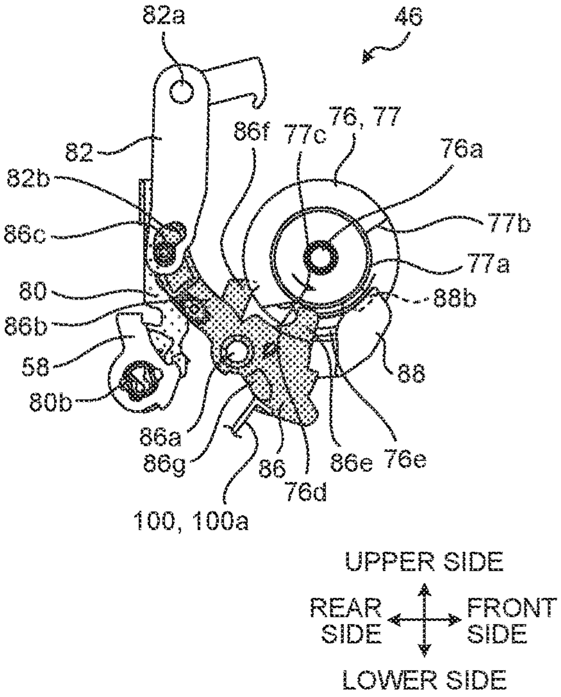

When the spring reception part 86*g* gets over the bent part 100*a* or the lock spring 100, the cam wheel 76 starts to normally rotate by being driven by the motor 94. As illustrated in FIG. 9C, when normal rotation of the cam wheel 76 proceeds to substantially 40 degrees from the state of FIG. 9B, the cam wheel 76 returns to the reference position illustrated in FIG. 9A. However, the spring reception part 86*g* is held by the bent part 100*a*, so that the lock lever 86, the sub-lock lever 82, and the open link 80 are kept in the attitude illustrated in FIG. 9B. Accordingly, the lock mechanism 46 is caused to be in the unlocked state. At this point, due to normal rotation of the cam wheel 76, the holding wall 76*e* is arranged on an outer peripheral side of the circular arc projection 88*b*, and the circular arc projection 88*b* is caused to be in a state of engaging with an inner peripheral surface of the holding wall 76*e*.

Figure 9D:
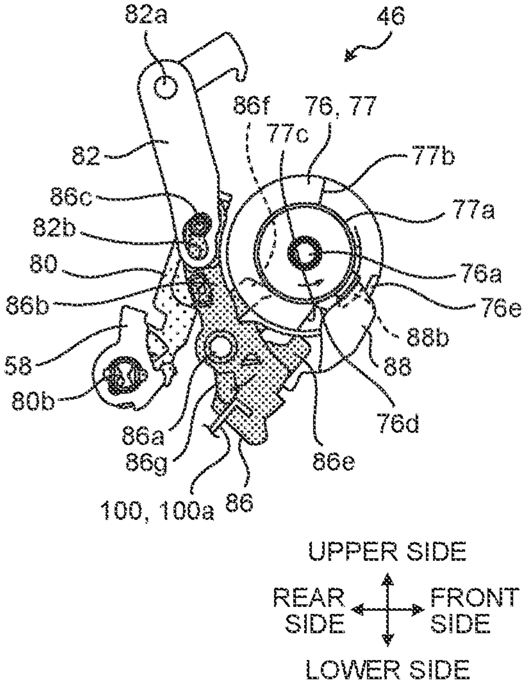

When normal rotation of the cam wheel 76 further proceeds by substantially 40 degrees from the state illustrated in FIG. 9C, the first tilted wall 77*c* of the cam wheel 76 abuts on the first projection 86*e*. Accordingly, the lock lever 86 rotates clockwise, and as illustrated in FIG. 9D, the spring reception part 86*g* gets over the bent part 100*a* of the lock spring 100 to return to the reference state illustrated in FIG. 9A.

When the lock lever 86 rotates clockwise, the sub-lock lever 82 is rotated counterclockwise via the outer knob 86*c*, the open link 80 is rotated clockwise by the knob lever 78 that is rotated by elastic force of the lever spring 78*b*, and each of the sub-lock lever 82 and the open link 80 returns to the reference state illustrated in FIG. 9A.

On the other hand, the circular arc projection 88*b* engages with the holding wall 76*e* of the cam wheel 76, so that the auxiliary lever 88 is maintained in a state of rotating counterclockwise against elastic force of the auxiliary lever spring 88*c*. When normal rotation of the cam wheel 76 further proceeds from this state, the regulating projection 77*b* abuts on the rotation stopper 96 of the case 20 via the elastic member 96*a*, and rotation of the cam wheel 76 is stopped. Due to this, excessive rotation of the cam wheel 76 can be prevented.

After the regulating projection 77*b* abuts on the rotation stopper 96 and rotation of the cam wheel 76 is stopped, the cam wheel 76 starts to reversely rotate by being driven by the motor 94. When reverse rotation of the cam wheel 76 proceeds to the position illustrated in FIG. 9A, engagement between circular arc projection. 88*b* and the holding wall 76*e* is released. Due to this, the auxiliary lever 88 is rotated clockwise by elastic force of the auxiliary lever spring 88*c*, and returns to the position illustrated in FIG. 9A. In this way, the entire lock mechanism 46 returns to the basic state illustrated in FIG. 9A.

In this way, with the door latch device 10 described above, the unlatch operation for the latch mechanism 44 and switching of the lock mechanism 46 between the locked state and the unlocked state can be performed by the single motor 94. Furthermore the cam part 110 is disposed only on the one inner end face 76*b* of the cam wheel 76, so that the knob lever 78 and the open lever may be disposed only in a region opposed to the inner end face 76*b* of the cam wheel 76, and the levers 78 and 84 are not disposed in a region opposed to the outer peripheral surface of the cam wheel 76. Thus, it possible to prevent a situation in which the size of the door latch device 10 is increased.

The individual cam surfaces 111*a* and 112*a* are caused to abut on the knob lever 78 and the open lever 84, so that the levers 78 and 84 can be operated at a desired optional timing without influencing mutual operations by appropriately changing profiles of the cam surfaces 111*a* and 112*a*, and the door latch device 10 satisfying needs of the user can be applied.

In the embodiment described above, the first cam and the second cam are disposed on the outer peripheral surface of the cam part, but the embodiment is not limited thereto. Any one of the cam surfaces or both of the cam surfaces may be formed on the inner peripheral surface of the cam part.

In the embodiment described above, exemplified is the actuator applied to the door latch device, but the actuator can also be applied as an actuator for another device.

According to the present disclosure, the cam part is disposed only on the one end face of the rotating body, so that each of the first lever and the second lever may be disposed only in a region opposed to the one end face of the rotating body, and each lever is not disposed in a region opposed to the outer peripheral surface of the rotating body. Accordingly, it is possible to prevent the size of the device from being increased.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A door latch device comprising:

a latch mechanism which maintains a door closed relative to a vehicle body by engaging with a striker to bring the striker into a latched state;

a motor;

a rotating body configured to be rotated and driven by the motor with respect to a case;

and a lock mechanism including i) a first lever and a second lever which are disposed to be rotatable with respect to the case and are configured to be operated by a cam part disposed on the rotating body and ii) an open link which moves between a locked position and an unlocked position, wherein the lock mechanism switches between i) a locked state in which the open link is at the locked position such that a releasing operation of the latched state by a manual operation is inactivated and ii) an unlocked state in which the open link is at the unlocked position such that the releasing operation of the latched state by the manual operation is activated, wherein the open link is moved to the unlocked position when the first lever is rotated by the cam part, wherein the latched state of the striker is released when the second lever is rotated by the cam part when the lock mechanism is in the locked state, wherein the cam part is disposed only on one end face of the rotating body, wherein the cam part includes a first cam configured to operate the first lever and a second cam configured to operate the second lever which are individually disposed in the cam part, wherein when the state of the latch mechanism is set to an unlatched state, not only the second lever but also the first lever are rotated so as to rotate the open link, thereby increasing a frequency of stirring grease inside the case by the open link, wherein the first lever includes a knob disposed at a distal end part thereof, wherein the open link includes a side surface guide groove, and wherein the knob of the first lever engages with the side surface guide groove of the open link so that the open link rotates when the knob moves along the side surface guide groove.

2. The door latch device according to claim 1, wherein each of the first cam and the second cam has a cam surface on an outer circumference, and the cam surface of the first cam and the cam surface of the second cam are disposed side by side with each other in an axial direction of the rotating body.

3. The door latch device according to claim 2, wherein the cam surface of the first cam and the cam surface of the second cam are configured to partially match with each other.

4. The door latch device according to claim 1, wherein an elastic member, which is configured to maintain the rotating body at a neutral position with respect to the case, is disposed between the case and another end face of the rotating body.

* * * * *